Patented Mar. 23, 1926.

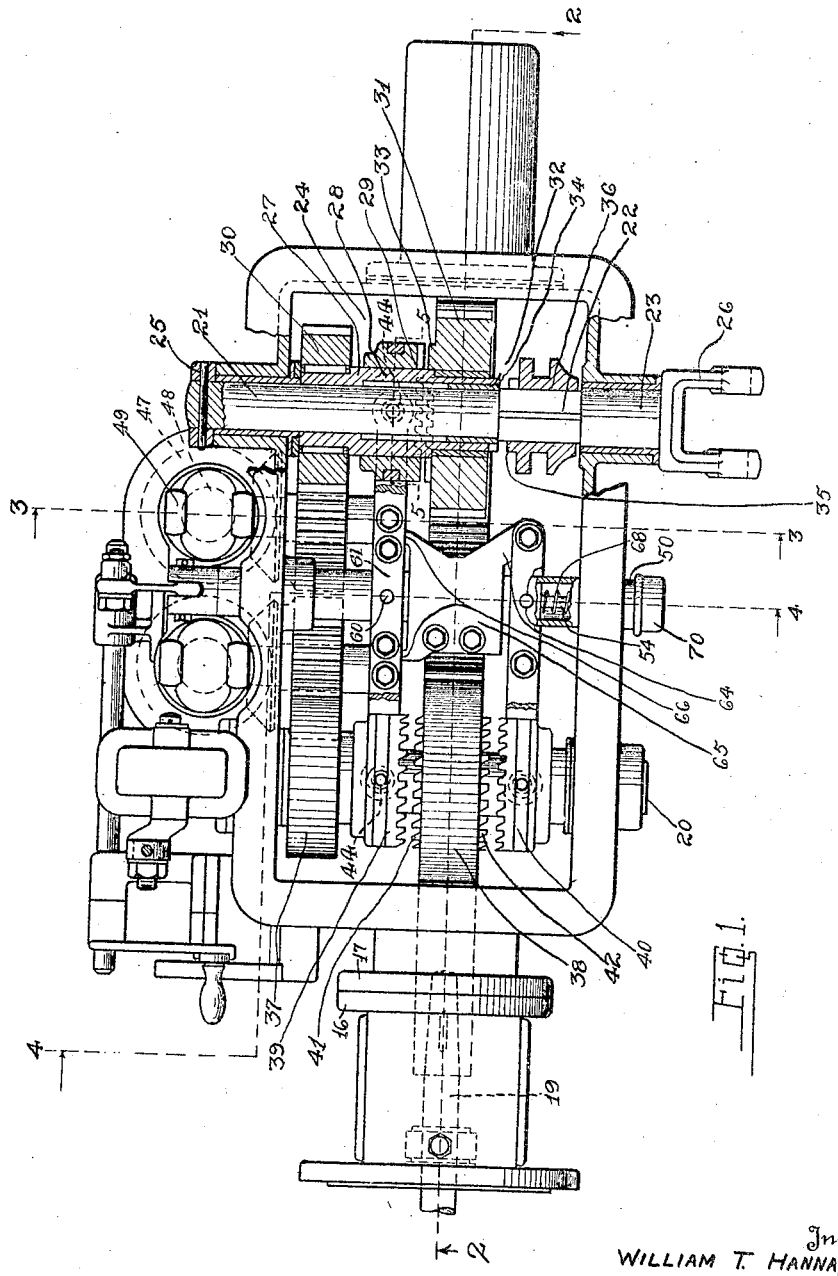

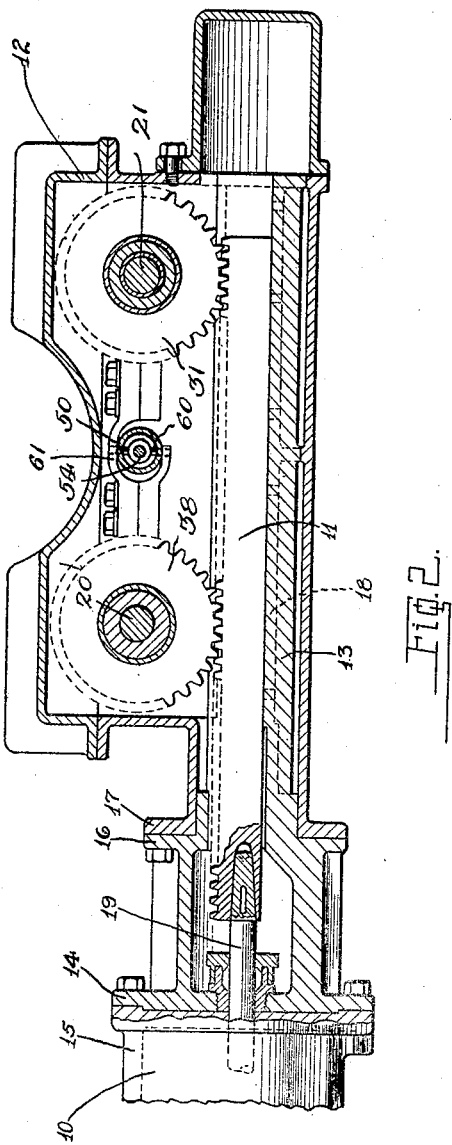

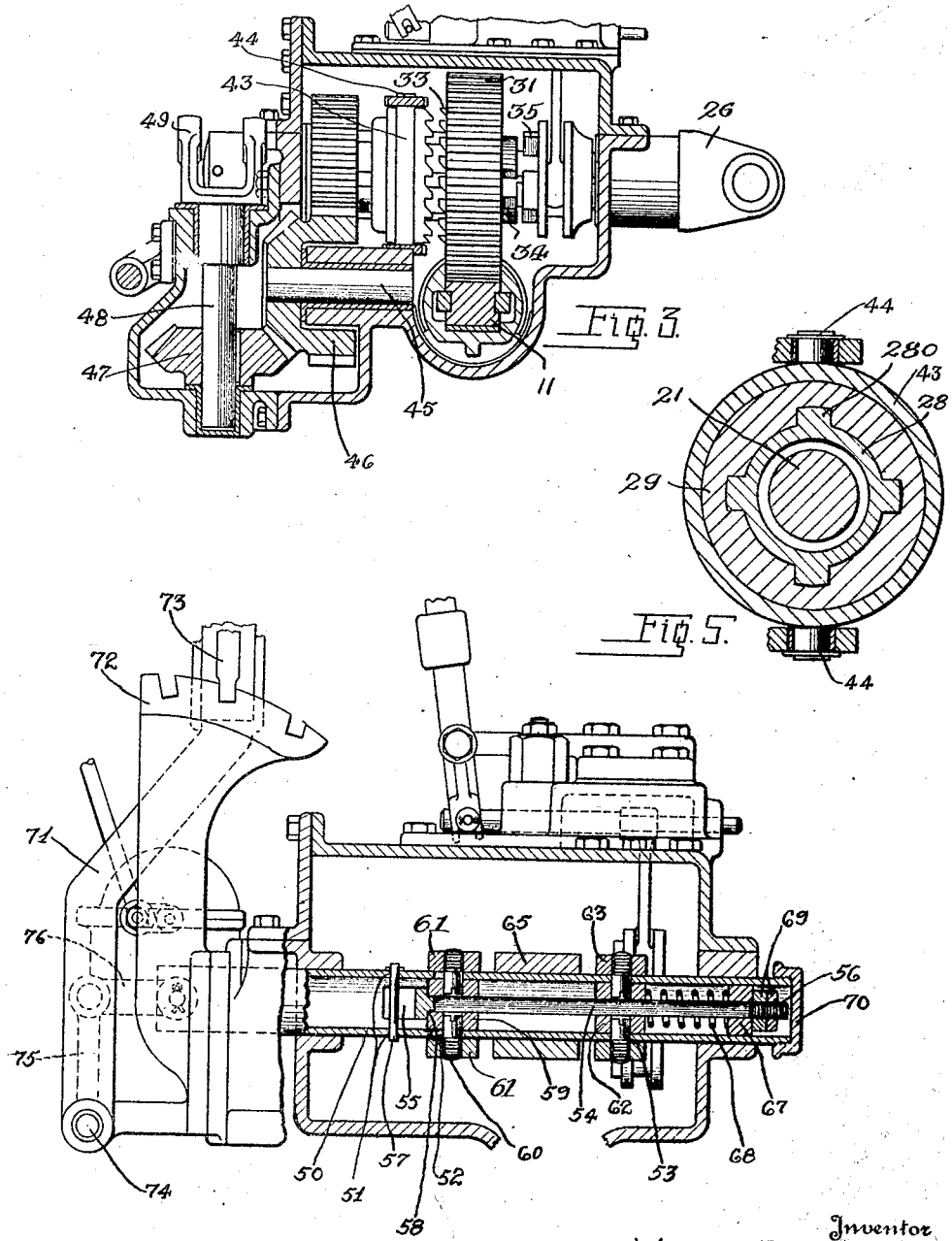

1,577,462

UNITED STATES PATENT OFFICE.

WILLIAM T. HANNA, OF CINCINNATI, OHIO.

POWER-TRANSMISSION DEVICE.

Original application filed July 6, 1921, Serial No. 482,790. Divided and this application filed May 20, 1924. Serial No. 714,697.

*To all whom it may concern:*

Be it known that I, WILLIAM T. HANNA, a citizen of the United States of America, and a resident of Cincinnati, in the county of Hamilton and State of Ohio, have invented a new and useful Improvement in a Power-Transmission Device, of which the following is a specification.

This application is a divisional application of my application Serial #482,790, filed July 6, 1921.

An object of my invention is to provide a power transmission device of a type which is especially useful in driving locomotive stoking devices.

Another object of my invention is to provide a device of this type wherein it is possible to readily dissociate parts thereof, in order to effect repairs or replacements.

Another object of my invention is to provide a device of this kind wherein continuous rotary motion is imparted to a stoker mechanism.

Another object of my invention is to provide a device of this kind which may be readily reversed or totally stopped.

These and other objects are attained by the means described herein and disclosed in the accompanying drawings, in which:

Fig. 1 is a plan view of the power transmission mechanism embodying my invention.

Fig. 2 is a sectional view on line 2—2 of Fig. 1.

Fig. 3 is a sectional view on line 3—3 of Fig. 1.

Fig. 4 is a sectional view on line 4—4 of Fig. 1.

Fig. 5 is a sectional view taken on line 5—5 of Fig. 1.

The power transmission device of my invention is adapted to be driven from a suitable driving mechanism such as an engine 10 of the reciprocating type which is operatively connected to a rack 11 which extends into a casing 12 of the transmission mechanism. The rack 11 is slidably mounted upon a rack housing 13, which extends removably into the housing transversely thereto. The rack housing 13 has a flange 14 formed at its outer end whereby the rack housing is removably mounted upon the cylinder 15 of the engine 10. A second flange 16 is formed on the rack housing, said second flange being removably mounted upon the flange 17 of the casing 12. Suitable bolts are used to secure the several flanges one upon the other. The rack housing has a longitudinal way 18 formed therein, within which way the rack may be longitudinally reciprocated, by means of the piston rod 19 of the engine. The engine may be of a reversible type, whereby the cylinder on each side of the piston thereof, may be exhausted at will. An engine of this type renders the power transmission mechanism more effective for a reversal of movement in an emergency. The transmission mechanism comprises the casing 12 transversely to which casing, and through the lower portion of which extends the rack housing 13. Parallel shafts 20 and 21 are revolubly mounted upon the housing and extend transversely to the line of movement of the rack 11. The ends of the shaft 21 are cylindrical and have formed between them a section 22, substantially square in cross section. The one cylindrical end 23 is of a diameter greater than the section 22, and the other cylindrical portion of the shaft. The enlarged portion 23 is mounted upon a suitable bearing mounted on the casing, and with the reduced portion of such shaft, which reduced portion is in a like manner mounted upon a bearing mounted upon the casing, serve to revolubly mount the shaft upon the casing 12. The central portion of the shaft is disposed within the chamber 24, formed within the casing 12, and the ends of the shaft extend beyond the casing walls. The reduced portion of the shaft has a collar 25 mounted upon it and the enlarged portion carries a coupling 26, the collar and coupling comprising means for limiting the lateral movement of the shaft. Interiorly to the chamber 24, and mounted upon the shaft 21, is a sleeve 27, having a central portion 28 upon which is mounted a toothed clutch member 29. The central portion 28 may be provided with keys 280 upon which the clutch members 29 and 39 may be splined. A cylindrical portion is formed on the sleeve on each side of the central portion 28, and upon the cylindrical portions are mounted the clutch gears 30 and 31. The gear 30 is keyed to the sleeve. A bushing 32 is placed into the sleeve and provides a bearing for the sleeve upon the shaft 21.

The gear 31 is loosely mounted upon the sleeve and engages the rack 11. The gear 31 has formed upon its one side a series of teeth 33, adapted to intermesh with the teeth formed on the clutch member 29, when the gear 31 moves in a given direction, and to disengage themselves from the teeth in the clutch member when the gear 31 moves in an opposite direction. The sleeve has formed upon its end, into which the bushing 32 is passed, a series of clutch teeth 34. A series of complementary clutch teeth 35 formed on the yoke 36 slidably mounted upon the square portion 22 of the shaft 21, are adapted to intermesh with clutch teeth 34.

The shaft 20 has mounted upon it a gear 37 corresponding to the gear 30, and a gear 38 corresponding to the gear 31. A sleeve is revolubly mounted upon the shaft 20 in the same manner as is the sleeve 27 mounted on the shaft 21. The gear 37 is keyed to the sleeve on the shaft 20, and the gear 38 is revolubly mounted on said sleeve. The sleeve mounted upon the shaft 20 differs from the sleeve 27, in that it has two square portions, one of each of which is adapted to lie upon each side of the gear 38. A clutch member 39 is disposed upon the square portion of the sleeve intermediate the ends thereof, and a reverse clutch member 40 is mounted upon the square end of the sleeve adapted to extend beyond the gear 38. The gear 38 has formed upon its opposite sides, a series of teeth 41 and 42, constructed as are the teeth on the gear 31. The teeth 41 are adapted to mesh with the teeth on the clutch member 39, during the time when the teeth 33 on the gear 31 are out of engagement with the teeth on the clutch member 29.

Each clutch member is revolubly mounted within a band bearing 43, having stud bearings 44 extending therefrom. Means are provided to retain the clutch members in such positions that the teeth thereof will not engage the teeth on the gears 31 and 38. This arrangement will be explained hereafter.

The shaft 20 is mounted upon suitable bearings which in turn, are mounted upon the casing 12, in substantially the same manner as are mounted the bearings supporting the shafts 21. The stud shafts 45 are mounted in the lower part of the casing below and parallel with the shafts 20 and 21, and have mounted upon them combined spur and bevel gears 46. The spur teeth of these gears intermesh with one another, and also engage, one with the teeth of the gear 30, and the other with the teeth of the gear 37. The bevel gear portions of the gears 46 engage the bevel gears 47 mounted upon vertical shafts 48 mounted in suitable bearings upon the casing. The upper ends of the shafts 48 extend from the casing and have mounted upon them a coupling 49 of a universal joint. From the foregoing, it will be apparent that motion from both of the gears 31 and 38 may be transmitted jointly to both of the bevel gears 47.

A tube shaft 50, parallel with the shafts 20, 21 and 45, is mounted upon the casing, and extends through the chamber 24, and has formed in it a perforation 51 and longitudinal slots 52 and 53. Interiorly to the shaft and extending longitudinally thereof, is a rod 54 having a bifurcated end 55 and a threaded end 56. A pin 57 extends through the perforation 51, in the tube shaft, and extends between the branches of the bifurcated end of the rod. A shoulder 58 is formed at the junction of the bifurcated end of the rod with the central portion of the rod. A block 59 is slidably mounted upon the rod 54 and has extending from it, pins 60 which extend through the elongated slots 52 in the tube shaft. A fork or yoke 61 is slidably mounted upon the exterior of the tube shaft, and is secured to the block 59, by means of the pins 60. The stud bearing 44 on the band bearings mounting the clutch members engage the fork. A second block 62 is mounted upon the rod 54 and is in like manner connected with the yoke or fork 63 mounted upon the exterior of the tube shaft. The yoke or fork 61 has pivotally mounted upon its opposite ends, the clutch members 29 and 39. The fork 63 has pivotally mounted upon its one end the clutch member 40, the other end of the fork 63 being pivotally mounted upon the arm 64 extending from the plate 65 mounted upon the tube shaft 50. The plate 65 has formed upon it, opposite to the arm 64, the lugs 66 adapted to engage the fork 61 on the opposite sides of the pivotal mounting of said fork upon the tube shaft, whereby the parts may be positioned as shown in Fig. 1. The rod 54, contained within the tube shaft has mounted adjacent its threaded end, an abutment block 67, between which abutment block, and the block 62 is mounted a spring 68. The lock nuts 69 mounted upon the threaded end of the rod 54 are employed to adjust the tension of the spring 68 upon the blocks 67 and 62. The block 59 engages the shoulder 58 on the rod, and therefore is acted upon by the spring 67. In order to provide ready access to the lock nuts 69, the end of the tube shaft extending from the casing, has mounted upon it a cap 70 which may be removed in order to adjust the lock nuts 69. The uncapped end of the tube shaft extends from the other end of the casing, and is operatively connected with a lever 71, whereby the tube shaft may be reciprocated in the direction of its length. The reciprocation of the tube shaft is employed to move the clutch members into engagement with the gears 31 and 38.

The couplings 49 mounted upon the upper ends of the vertical shafts 48 are each adapted to have mounted upon them, complementary couplings, the two couplings being adapted to form part of a universal joint. Each of such complementary couplings (not shown) may be adapted to seat into an angular socket for completing such universal joints.

The coupling 26 in like manner may be provided with a complementary coupling member for providing a universal joint, said universal joints being connected to the mechanism to be driven through the transmission means.

Suitable means, such as a notched plate 72, shown adjacent the lever 71 may be employed with said lever to lock it in the various positions, by means of an ordinary plunger 73 on the lever 71 which may engage the notches in the plate 72. The plate 72 has disposed within it three notches, whereby, through the agency of the lever and plunger thereon, the tube shaft may be retained in such positions that the clutch members may be held in any one of three positions; first, wherein all the clutch members are out of engagement with the gears 30 and 31; second, wherein the clutch members 29 and 39 may engage the gears 31 and 38; and third, wherein the clutch member 40 may engage the gear 38. The lever 71 is pivotally mounted upon a transverse shaft 74 which is pivotally mounted upon the exterior of the casing. An arm 75 is connected with the tube shaft 50 by means of a link 76 which is pivotally connected with the arm 75. The operation of the device is as follows:

When the parts are in the positions as shown in the drawings, the rack 11 is free to be reciprocated, and to thereby revolubly actuate the gears 38 and 31, without imparting any motion to the universal joints. Assuming now that the rack 11 is being reciprocated, and that the lever 71 is actuated so as to move the tube shaft 50 in such direction that the cap 70 is moved farther from the casing, than is shown in Figs. 1 and 4, wherefore the clutch members 29 and 39 assume such positions that their respective teeth may engage the teeth upon the gears 31 and 38 respectively. The yoke 61, because of its pivotal mounting upon the pins 60, and because of the action of the spring 68 upon said pivotal mounting, causes the clutch members 29 and 39 to be alternately moved into and out of engagement with the gears 31 and 38 respectively. In this way motion is transmitted first from gear 31, to the sleeve 27, to the gear 30, and then to the combined lever and spur gears 46 from which the universal joints are actuated, and then after the rack has completed its stroke in one direction, and the clutch member 29 is disengaged from the gear 31, the gear 31 is free to be revolubly actuated in an opposite direction without effecting the movement of the sleeve 27, while the gear 38 is imparting motion through its complementary clutch member 39 to the sleeve mounting, the gear 38 and from this sleeve to the gear 37, and to the combined bevel and spur gears 46. It should be observed that there is a continuous movement of the sleeve upon which the clutch gears 31 and 38 are mounted, although these gears alternately are the driving forces actuating these sleeves, wherefore, when the clutch 36 is moved into engagement with the sleeve 27, a continuous motion is imparted from the sleeve 27 to the shaft not shown, which may be connected to the universal joint 26. If for any reason, it is desired to reverse the direction of the rotation, the lever 71 is actuated so as to move the tube shaft 50 to its opposite limit, wherefore the clutch members 29 and 39 are disengaged from the gears 31 and 38, and the clutch member 40 is moved into engagement with the gear 38. The yoke 63, together with the spring 68, actuates the clutch member 40 in the same manner in which the clutch members 29 and 39 are actuated. It should be observed that during the reverse operation, there is an intermittent motion transmitted to the universal joints. This intermittent motion is sufficient to provide necessary movement of a stoker mechanism, which might be attached thereto; such reverse motion being necessary only to permit the removal of obstructions from such stoker mechanism. It should be observed that with this arrangement it is possible to discontinue the movement of one of the universal joints, while the others are operative either in a forward or reverse direction.

What I claim is:

1. In a power transmission mechanism the combination of a reciprocating rack, parallel shafts disposed transversely of the line of reciprocation of the rack, a sleeve mounted on each of the parallel shafts, a gear revolubly mounted upon each of the sleeves and engaging the rack, gears fixedly mounted on each of the sleeves and being adapted to transmit motion one to the other, means adapted to transmit motion from one of the first mentioned gears to its supporting sleeve upon the forward movement of the rack and to transmit motion from the other of the first mentioned gears to its respective sleeve upon the return movement of the rack.

2. In a power transmission mechanism the combination of a reciprocating rack, parallel shafts disposed transversely of the line of reciprocation of the rack, a sleeve mounted on each of the parallel shafts, a gear revolubly mounted upon each of the sleeves and engaging the rack, gears fixedly mounted on each of the sleeves and being adapted to transmit motion one to the other, means adapted to transmit motion from one of the first mentioned gears to its supporting sleeve upon the forward movement of the rack and to transmit motion from the other of the first mentioned gears to its respective sleeve upon the return movement of the rack, and means adapted to transmit motion from the sleeves to the parallel shafts.

3. In a power transmission mechanism the combination of a reciprocating rack, parallel shafts disposed tranversely of the line of reciprocation of the rack, a sleeve mounted revolubly on each of the parallel shafts, a gear mounted revolubly on each sleeve and engaging the rack and adapted to be revolubly actuated thereby, clutch teeth formed on the said gears, gears fixedly mounted upon the sleeves adapted to transmit motion one to the other, clutch members slidably mounted upon the sleeves and splined thereto and being adapted to be moved into engagement with the clutch teeth on the first mentioned gears, and means adapted to move the clutch members into driving relation with the first mentioned gears in alternate sequence upon the change of stroke of the rack.

4. In a power transmission mechanism the combination of a reciprocating rack, parallel shafts disposed transversely of the line of reciprocation of the rack, a sleeve mounted revolubly on each of the parallel shafts, a gear mounted revolubly on each sleeve and engaging the rack and adapted to be revolubly actuated thereby, clutch teeth formed on the said gears, gears fixedly mounted upon the sleeves adapted to transmit motion one to the other, clutch members slidably mounted upon the sleeves and splined thereto and being adapted to be moved into engagement with the clutch teeth on the first mentioned gears, means adapted to move the clutch members into driving relation with the first mentioned gears in alternate sequence upon the change of stroke of the rack, and means to transmit motion from the sleeves to the parallel shafts.

5. In a power transmission mechanism the combination of a reciprocating rack, parallel shafts disposed transversely of the line of reciprocation of the rack, sleeves mounted revolubly upon the shafts, gears mounted revolubly upon the sleeves and engaging the rack and adapted to be revolubly actuated thereby, clutch members splined upon the sleeves adapted to be moved into driving engagement with the said gears, gears fixedly mounted upon the sleeves and being adapted to transmit motion one to the other, a tube shaft parallel with the first mentioned shafts, means adapted to longitudinally reciprocate the tube shaft, and means mounted upon the tube shaft adapted to alternately move the clutch members into and out of operative relation with the first mentioned gears in alternate sequence upon the change of the stroke of the rack.

6. In a power transmission mechanism the combination of a reciprocating rack, parallel shafts disposed transversely of the line of reciprocation of the rack, sleeves mounted revolubly upon the shafts, gears mounted revolubly upon the sleeves and engaging the rack and adapted to be revolubly actuated thereby, clutch members splined upon the sleeves adapted to be moved into driving engagement with the said gears, gears fixedly mounted upon the sleeves and being adapted to transmit motion one to the other, a tube shaft parallel with the first mentioned shafts, the tube shaft having a slot therethrough, a block mounted within the tube shaft, pins mounted upon the block and extending through the slots in the tube shaft, a fork pivotally mounted upon the pins and supporting the clutch members upon its oposite ends, and means within the tube shaft operative upon the block adapted to alternately move the clutch members into operative engagement with the first mentioned gears in alternate sequence upon the change of movement of the rack.

7. In a power transmission mechanism the combination of a reciprocating rack, parallel shafts disposed transversely of the line of reciprocation of the rack, sleeves mounted revolubly upon the shafts, gears mounted revolubly upon the sleeves, clutch members splined upon the sleeves and adapted to be moved into engagement with the gears and to transmit motion therefrom to the sleeves, gears fixedly mounted upon the sleeves adapted to transmit motion one to the other, a tube shaft parallel with the first mentioned shafts and having slots therein, a rod within the tube shaft, blocks slidably mounted upon the rod, pins mounted on the blocks and extending through the slots in the tube shaft, a yoke mounted slidably upon the exterior of the tube shaft and pivotally mounted upon the pins extending from one of the blocks in the tube shaft, the yoke having mounted upon its opposite ends the clutch members mounted on the first mentioned shafts, and yieldable means operative upon the blocks adapted to cooperate with the yoke and the clutch members in alternately moving opposite clutch members into driving engagement with their respective cooperating gears.

8. In a power transmission mechanism the combination of a reciprocating rack, parallel shafts disposed transversely of the line of reciprocation of the rack, gears revolubly mounted upon the parallel shafts engaging the rack adapted to be revolubly actuated thereby, clutch members splined upon the parallel shafts adapted to be moved into driving relation with the gears and to thereby transmit motion from the gears to the shafts, gears fixedly mounted upon the shafts in driving relation with one another, a slotted tube shaft extending parallel with the first mentioned shafts, a rod mounted within the tube shaft having a bifurcated end and a threaded end, a shoulder formed on the rod at the junction of the bifurcated end with the intermediate portion of the rod, a block slidably mounted upon the rod and adapted to abut the shoulder on the rod, a second block mounted upon the rod intermediate its ends, pins on the blocks extending through the slots in the tube shaft, an abutment block adjustably mounted on the rod adjacent the threaded end thereof, means yieldingly spacing the second mentioned block and the abutment block, a pin extending through the tube shaft lying between the branches of the bifurcated end of the rod, forks pivotally mounted upon the pins extending from the blocks, the fork mounted upon the first mentioned block having mounted upon each of its opposite ends one of the clutch members splined upon the parallel shafts, the fork mounted upon the second mentioned block having its one end pivotally mounted upon the tube shaft and having mounted at its other end a reverse clutch member mounted upon one of the parallel shafts, and means to longitudinally reciprocate the tube shaft whereby the clutch members mounted upon the first mentioned fork may be moved into driving engagement with the first mentioned gears, the clutch member mounted upon the second mentioned fork being moved into engagement with one of said first mentioned gears, and whereby the clutches may be positioned out of engagement with said first mentioned gears.

9. In a power transmission mechanism the combination of a reciprocating rack, parallel shafts disposed transversely of the line of reciprocation of the rack, gears mounted revolubly on the shafts engaging the rack adapted to be revolubly actuated by the rack, gears fixedly mounted upon the shafts, stud shafts mounted in parallelism with the first mentioned shafts, a combined spur and bevel gear mounted on each stud shaft, the spur teeth thereof engaging the gears fixed upon the first mentioned parallel shafts and engaging one with another, shafts disposed at an angle to the parallel shafts, beveled gears upon the last mentioned shafts engaging the beveled gears formed on the combined spur and bevel gears, and means to alternately fix upon the first mentioned parallel shafts the gears revolubly mounted thereupon at the change in stroke of the rack.

10. In a power transmission mechanism the combination of a casing, a way formed within the casing, a rack housing mounted removably within the way in the casing and being adapted to be secured upon the casing, the housing having a way therein, a rack adapted to be reciprocated in the way, parallel shafts disposed transversely of the line of reciprocation of the rack, gears mounted revolubly on the shafts engaging the rack adapted to be revolubly actuated by the rack, gears fixedly mounted upon the shafts, stud shafts mounted in parallelism with the first mentioned shafts, a combined spur and bevel gear mounted on each stud shaft, the spur teeth thereof engaging the gears fixed upon the first mentioned parallel shafts and engaging one with another, vertical shafts disposed at an angle to the parallel shafts, beveled gears upon the last mentioned shafts engaging the beveled gears formed on the combined spur and bevel gears, and means to alternately fix upon the first mentioned parallel shafts the gears revolubly mounted thereupon at the change in stroke of the rack.

11. In a power transmission mechanism the combination of a reciprocating rack, a shaft mounted transversely of the line of reciprocation of the rack, a gear mounted revolubly on the shaft engaging the rack, a clutch member splined upon the shaft, complementary teeth on the clutch member and on the gear adapted to bind the clutch member and gear when the gear moves in one direction and to disassociate themselves when the gear moves in the opposite direction, a tube shaft parallel with the first mentioned shaft and having an elongated slot extending longitudinally thereof, a block mounted slidably within the tube shaft, a pin extending through the slot in the tube shaft, a fork mounted intermediate its ends and pivotally upon the pin, and supporting the clutch member at one of its ends, a pivotal mounting for the other end of the fork, and means operative upon the block yieldingly resisting movement of the block.

12. In a power transmission mechanism the combination of a reciprocating rack, a shaft mounted transversely of the line of reciprocation of the rack, a gear mounted revolubly on the shaft engaging the rack, a clutch member splined upon the shaft, complementary teeth on the clutch member and on the gear adapted to bind the clutch member and gear when the gear moves in one direction and to disassociate themselves when the gear moves in the opposite direction, a tube shaft parallel with the first mentioned shaft and having an elongated slot extending longitudinally thereof, a block mounted slidably within the tube shaft, a pin extending through the slot in the tube shaft, a fork mounted intermediate its ends and pivotally upon the pin and supporting the clutch member at one of its ends, a pivotal mounting for the other end of the fork, means operative upon the block yieldingly resisting movement of the block, and means to move the clutch member into and out of operative relation to the gear.

In testimony whereof, I have hereunto subscribed my name this 13th day of May, 1924.

WILLIAM T. HANNA.